Sept. 4, 1956 M. L. ABEL 2,761,746
PILLOW BLOCK
Filed March 27, 1953 2 Sheets-Sheet 1
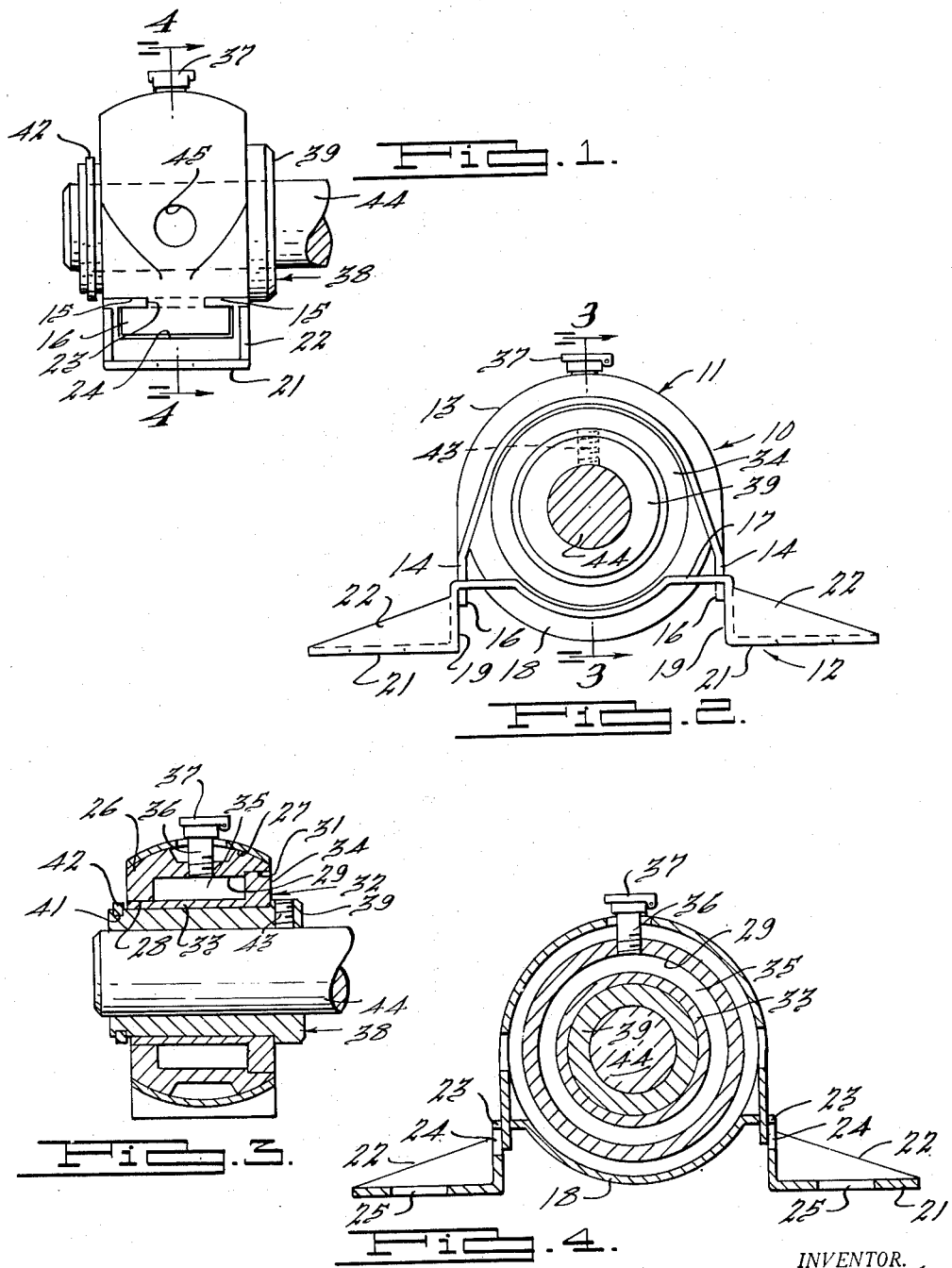
INVENTOR.
Martin L. Abel.
BY
Harness, Dickey & Pierce.
ATTORNEYS.

Sept. 4, 1956 M. L. ABEL 2,761,746
PILLOW BLOCK

Filed March 27, 1953 2 Sheets-Sheet 2

INVENTOR.
Martin L. Abel.
BY
Harness, Dickey & Pierce
ATTORNEYS

United States Patent Office 2,761,746
Patented Sept. 4, 1956

2,761,746

PILLOW BLOCK

Martin L. Abel, Detroit, Mich., assignor to Tann Corporation, Detroit, Mich., a corporation of Michigan Application March 27, 1953, Serial No. 345,043

14 Claims. (Cl. 308—72)

This invention relates to pillow blocks, and particularly to a pillow block having a pair of telescoped bearings the inner one of which receives a shaft which is secured thereto.

Heretofore, it has been the practice to provide pillow blocks having a single bearing which receives a shaft for rotation therein. As this shaft may be that of an armature of a motor or a cylindrical rod which becomes scratched and burred from handling and which normally is not intended to be employed as a bearing surface, satisfactory journaling of the shaft in the bearing very seldom resulted.

The present invention pertains to the use of a pillow block having a pair of telescoped bearings the inner one of which receives the shaft, which is fixed thereto. In this arrangement, the shaft, whether damaged or not, never contacts the bearing surface and, as a result, satisfactory bearing support is provided by the present pillow block at all times.

Accordingly, the main objects of the invention are: to provide a pillow block for a shaft in which the shaft is rigidly secured to a bearing; to provide a pillow block with a pair of telescoped bearings, the inner one of which is provided with an aperture for receiving a shaft and with means for securing the shaft in fixed relation thereto; to provide a two-piece snap connected housing for supporting the pillow block as a unit in a manner to permit the contained telescoped bearings to be self-aligning therewithin, and, in general, to provide a pillow block which is simple in construction, positive in operation and economical to manufacture.

Other objects and features of novelty of the invention will be specifically pointed out or will become apparent when referring, for a better understanding of the invention, to the following description, taken in conjunction with the accompanying drawings, wherein:

Figure 1 is a view in side elevation of a pillow block embodying features of the present invention;

Fig. 2 is an end view of the structure illustrated in Fig. 1;

Fig. 3 is a sectional view of the structure illustrated in Fig. 2;

Fig. 4 is a sectional view of the structure illustrated in Fig. 1, taken on the line 4—4 thereof;

Figure 5:
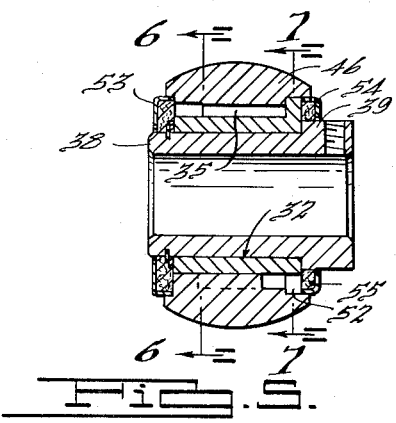
Fig. 5 is a sectional view of structure, similar to that illustrated in Fig. 3, showing a further form of the invention.
Figure 6:
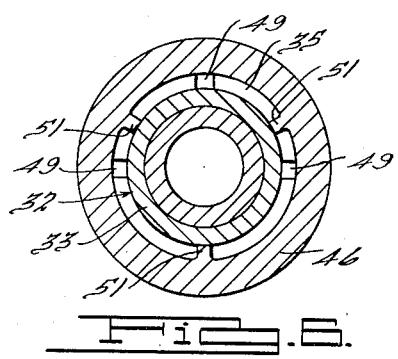
Fig. 6 is a sectional view of the structure illustrated in Fig. 5, taken on the line 6—6 thereof.
Figure 7:
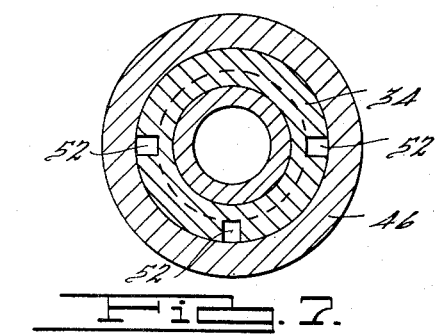
Fig. 7 is a sectional view of the structure illustrated in Fig. 5, taken on the line 7—7 thereof.
Figure 8:
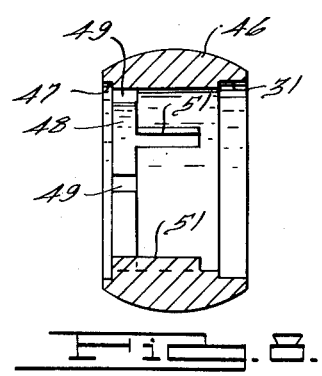
Fig. 8 is a sectional view in elevation of the body of the element illustrated in Fig. 5.

The pillow block of the present invention embodies a housing 10 comprising a U-shaped stamping 11 and a base stamping 12. The U-shaped stamping 11 has a lateral arcuate portion 13 and spaced substantially parallel arms 14 at the ends. Each of the arms is provided with slots 15 extending inwardly from each side, forming end tabs 16. The base portion 12 of the housing is provided with a central web 17 which contains an arcuate portion 18 which, when assembled with the U-shaped portion 11, is disposed in extension of the arcuate portion 13. A web 17 is deflected downwardly at 19 and outwardly at 21 to form supporting feet, with side webs 22 between the webs 19 and 21 to add strength thereto. A slot 23 is provided at each end of the web 17 and a slot 24 is disposed through each of the webs 19 for the reception of the tab which in assembled position extends beneath the web 17, as clearly illustrated in Fig. 2, for locking the U-shaped portion 11 upon the base portion 12. It is to be understood that the arms 14 are stressed in a manner to move toward each other after they are separated when moved over the ends of the web portion to lock themselves thereafter beneath the ends thereof. To this end, the U-shaped portion may be constructed from spring material. Apertures 25 are provided in the web portion 21 for the reception of screws or bolts for mounting the assembly upon a support.

A bearing supporting block 26 has its outer surface of truncated spherical section 27 which mates with the arcuate surfaces 13 and 18 of the housing elements. The bearing block is apertured in different steps, the side portion 28 having a smaller diameter than the central portion 29 which is of smaller diameter than the opposite side portion 31. A bearing 32, which is preferably of porous metal, has a sleeve portion 33 which is press-fitted into the aperture 28, the bearing being provided with a shouldered portion 34 which is press-fitted in the aperture portion 31. The aperture portion 29 forms a reservoir 35 with the resulting assembly for a lubricant which may be provided through a tube 36 which is threaded into the block 26, the tube having a hinged cover 37.

A sleeve bearing 38 is disposed within the bearing 32, having a shoulder 39 at one end and an annular groove 41 at the opposite end. When the bearing 38 is assembled within the bearing 32, a snap ring 42 is disposed within the groove 41 for retaining the sleeves against endwise separation. A setscrew 43 is provided in the shouldered portion 39 of the bearing 38 for engaging and securing a shaft 44 within the bearing 38. When the pillow block is to be assembled on a horizontal support, the tube 36 is disposed diametrically opposite to the supporting feet 21 of the block, but when the feet are mounted on a vertical support, then the tube 36 may be disposed through an aperture 45 in the U-shaped portion 11 of the housing 10 by moving the bearing supporting block 26 90° from the position illustrated so as to have the pillow block disposed at the top of the assembly.

In this relation, the shaft is self-aligning within the pillow block and is secured in fixed relation to the bearing 38 so that irrespective of any rough surface upon the shaft 44, it will not mar the bearing 32 which it would otherwise contact. As a result, perfect bearing surfaces are always provided for the supported shaft, which substantially increases the life of operation of the bearing and prevents overheating and excessive wear which would otherwise occur. By having the housing portions 11 and 12 secured together, a unit assembly results which provides the proper amount of friction between the housing and bearing supporting block 26 which is always free to adjust itself within the housing.

Referring to Figs. 5 to 9 inclusive, a pillow block bearing is illustrated having self-contained lubricant therein which differs from the bearing illustrated in Figs. 1 to 4 wherein a lubricant orifice is provided for introducing lubricant into the bearing 11. In the present arrangement, the same U-shaped stampings 11 and 12 above described are employed for supporting the blocks 46 for relative adjustment therein, the same as the block 26 above referred to. The block 46 is similar to the block 26 with the exception that a shouldered recess 47 is provided on the opposite side thereof additionally to the shouldered recess 31 on the forward side thereof. The adjacent projecting shoulder portion 48 is provided with apertures 49 and with ribs 51, as more clearly illustrated in Figs. 6 and 8. The ribs 51 provide additional support for the sleeve portion 33 of the bearing 32 when the sleeve portion is fitted to the surface of the shoulder portion 48 and the shoulder portion 34 of the sleeve is nested within the recess 31 of the supporting block 46. The shoulder portion 34 has slots 52 provided therein, and these slots, along with the slots 47, communicate with the reservoir 35 provided by the assembly.

Cups 53 and 54 are disposed over the end of the sleeve bearing 38 and shoulder 39 thereof, retained in the recesses 47 and 31, respectively. In view of the fact that the sleeve bearing 38 has a perfect fit with the sleeve of the bearing 32, and the fact that the sleeve bearing 32 is a porous bearing, a pumping action will result upon the relative rotation of the bearings, producing a flow of oil from the reservoir 35 through the porous wall of the sleeve bearing 32 which will pass along the surface of the sleeve bearing 38 and be thrown off near the ends thereof. The cups 53 and 54 receive the lubricant thrown off in this manner which may pass through the apertures 47 and 52 back into the reservoir. A wick material 55 may be provided in the cups 53 and 54 for absorbing the lubricant and retaining it until it passes through the apertures back into the reservoir.

Figure 9:
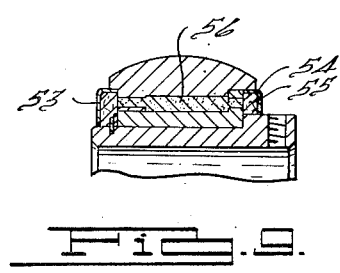
Fig. 9 is a view of structure, similar to that illustrated in Fig. 5, showing a further form thereof.

In Fig. 9, in addition to the wicking material 55 applied to the cups 53 and 54, a resin granulated material 56 having a great affinity for a lubricant, may be provided in the reservoir and in the apertures 47 and 52 so that the granules may absorb the lubricant from the wicking material, which may be wool or other types of fibres. The surface of the porous sleeve bearing 32, through which the lubricant may pass, produces a pumping effect thereon with the surface of the sleeve bearing 38 when the latter is rotated, causing the lubricant to pass from the ends of the bearings. The expelled lubricant is collected in the cups 53 and 54 and returned to the reservoir through the apertures 47 and 52. Besides using the wicking material in the cups, the granulated material in the reservoir and apertures, having a great affinity for the lubricant, will assist in returning the lubricant to the reservoir, thereby preventing the escape of the lubricant and providing a sealed type of bearing which is continuously lubricated throughout the life thereof. In view of the pumping action, a film of lubricant is constantly provided between the bearings so that wear is reduced to an absolute minimum and the life of the bearing is thereby substantially increased.

What is claimed is:

1. A pillow block having a housing made of two stampings, one stamping being of U-shape having an arcuate portion and two extending arms, the other stamping forming a base portion having means by which it is secured to a support, said base portion also having means thereon to which the arms are positively anchored in unit relation to be removable therefrom independent of the securing means whether or not the base portion is secured thereby, a bearing block having an outer truncated spherical shape mounted within the housing for tiltable movement therein, a bearing mounted within the black having an aperture for receiving a shaft, and locking means for securing the shaft to the bearing.

2. A pillow block comprising a housing of arcuate section, a bearing block mounted within the housing with its peripheral wall of truncated spherical form for tiltable movement within the housing, a porous sleeve fixed to said block to form a reservoir for a lubricant while providing an inner bearing surface, a sleeve bearing mounted in intimate engagement with the bearing surface of the sleeve for rotation relative thereto, means for securing said sleeve bearing within the porous sleeve against endwise separation, and means on said bearing for anchoring a shaft extending therewithin in fixed relation thereto.

3. In a pillow block, a housing comprising a U-shaped member and a base member, said U-shaped member being of lateral arcuate shape and having arms extending therefrom with tabs provided on the ends of the arms, said base member having a central arcuate portion of lateral arcuate shape disposed in continuation of the arcuate portion of the U-shaped member when assembled together, and offset foot portions on said base member by which it is secured to a support, said base member having slots extending laterally inward near the ends of the central arcuate portion for receiving said tabs and positively locking the U-shaped portion thereto independently of the securing means for the offset foot portions.

4. In a pillow block, a housing comprising a U-shaped member and a base member, said U-shaped member being of lateral arcuate shape and having arms extending therefrom with tabs provided on the ends of the arms, said base member having a central arcuate portion of lateral arcuate shape disposed in continuation of the arcuate portion of the U-shaped member when assembled together, offset foot portions on said base member by which it is secured to a support, said base member having slots for receiving said tabs and positively locking the U-shaped portion thereto independently of the securing means for the offset foot portions, a bearing supporting block secured within the housing the peripheral surface of which is of truncated spherical section for engagement with the lateral arcuate shape of the housing and having a central opening of three different diameters, the central portion being of greater diameter than one end portion and of less diameter than the other end portion, a shouldered sleeve of porous metal fixed to said bearing supporting block in a manner to provide an annular recess in the central portion of the block, a shouldered bearing mounted within said sleeve having an annular recess on the end opposite to the shoulder, a snap ring disposed in said recess for preventing endwise separation of the sleeve and bearing, and locking means carried by the bearing for engagement with a shaft disposed therein for locking the bearing to the shaft.

5. In a pillow block, a housing comprising a U-shaped member and a base member, said U-shaped member being of lateral arcuate shape and having arms extending therefrom with tabs provided on the ends of the arms, said base member having a central arcuate portion of lateral arcuate shape disposed in continuation of the arcuate portion of the U-shaped members when assembled together, offset foot portions on said base member by which it is secured to a support, said base member having slots for receiving said tabs and positively locking the U-shaped portion thereto independently of the offset foot portions of the base member, a bearing supporting block secured within the housing the peripheral surface of which is of truncated spherical section for engagement with the lateral arcuate shape of the housing and having a central opening of three different diameters, the central portion being of greater diameter than one end portion and of less diameter than the other end portion, a shouldered sleeve of porous metal fixed to said bearing supporting block in a manner to provide an annular recess in the central portion of the block, a shouldered bearing mounted within said sleeve having an annular recess on the end opposite to the shoulder, a snap ring disposed in said recess for preventing endwise separation of the sleeve and bearing, locking means carried by the bearing for engagement with a shaft disposed therein for locking the bearing to the shaft, said U-shaped portion of the housing having a pair of apertures provided therethrough, and an oiling tube extending through one of said apertures and secured to the bearing supporting block through which a lubricant may be provided to said annular recess formed between the bearing block and the shouldered sleeve.

6. A bearing including, in combination, a bearing block having a recess, a porous sleeve bearing fixed within the block forming a reservoir with said recess, a rotatable sleeve bearing mounted in said fixed sleeve bearing, and cups located adjacent to the ends of said rotatable bearing and press-fitted into the ends of said block, said reservoir being connected to the interior of said cups by intercommunicating passageways.

7. A bearing including, in combination, a bearing block having a recess, a porous sleeve bearing fixed within the block forming a reservoir with said recess, a rotatable sleeve bearing mounted in said fixed sleeve bearing, cups located adjacent to the ends of said rotatable bearing and secured to said block, said reservoir being connected to the interior of said cups by intercommunicating passageways, and wicking material provided in said cups.

8. A bearing including, in combination, a bearing block having a recess, a porous sleeve bearing fixed within the block forming a reservoir with said recess, a rotatable sleeve bearing mounted in said fixed sleeve bearing, cups located adjacent to the ends of said rotatable bearing and secured to said block, said reservoir being connected to the interior of said cups by intercommunicating passageways, wicking material provided in said cups, and a granulated lubrcant absorbing material in said reservoir and said passageways in communication with said wicking material.

9. A bearing block having an aperture therethrough, a shouldered recess at each end of the aperture, a shoulder extending inwardly at one end of the aperture having a plurality of notches therein, a shouldered sleeve bearing of porous material supported by said block with the shoulders forming a reservoir with passageways in communication therewith formed by notches in the shoulders, a rotatable shouldered bearing supported within said sleeve bearing, and cups supported in the recesses of said block adjacent to the end of the rotatable bearing and the shoulder thereof respectively for collecting and returning the lubricant passing from between the bearings to the reservoir.

10. A bearing block having an aperture therethrough, a shouldered recess at each end of the aperture, a shoulder extending inwardly at one end of the aperture having a plurality of notches therein, a shouldered sleeve bearing of porous material supported by said block with the shoulders forming a reservoir with passageways in communication therewith formed by notches in the shoulders, a rotatable shouldered bearing supported within said sleeve bearing, cups supported in the recesses of said block adjacent to the end of the rotatable bearing and the shoulder thereof respectively for collecting and returning the lubricant passing from between the bearings to the reservoir, and wick material disposed in said cups for retaining said lubricant.

11. A bearing block having an aperture therethrough, a shouldered recess at each end of the aperture, a shoulder extending inwardly at one end of the aperture having a plurality of notches therein, a shouldered sleeve bearing of porous material supported by said block with the shoulders forming a reservoir with passageways in communication therewith formed by notches in the shoulders, a rotatable shouldered bearing supported within said sleeve bearing, cups supported in the recesses of said block adjacent to the end of the rotatable bearing and the shoulder thereof respectively for collecting and returning the lubricant passing from between the bearings to the reservoir, wick material disposed in said cups for retaining said lubricant, and absorbing granulated material in said reservoir and passageways in engagement with said wick material.

12. A housing for a pillow block made of two stampings, one stamping being of U-shape having an arcuate portion and two extending arms, the other stamping forming a base portion having means securable to a support, the ends of said arms and said base portion interlocking for positively securing the two stampings in unit relation to each other and separable from each other independent of said securing means when the base portion is secured in position, said base portion having a portion which is disposed in annular relation to the arcuate portion of said first stamping when the stampings are in secured relation.

13. A bearing block having a recess formed by extending lands, a sleeve pervious to the flow of a lubricant supported in said recess on said lands, a rotatable sleeve within said first sleeve, cuplike elements press-fitted on said block through which said rotatable sleeve extends, and means directing the lubricant which passes toward the ends of the rotatable sleeve to said cuplike elements, said recess communicating with the interior of said cuplike elements.

14. A bearing block having a recess formed by extending lands, a sleeve pervious to the flow of a lubricant supported in said recess on said lands, a rotatable sleeve within said first sleeve, cuplike elements on said block through which said rotatable sleeve extends, means directing the lubricant which passes toward the ends of the rotatable sleeve, to said cuplike elements, said recess communicating with the interior of said cuplike elements, and a ring secured to at least one end of the rotatable sleeve extending into the area of said cuplike element.

References Cited in the file of this patent

UNITED STATES PATENTS

| | | |
|---|---|---|
| 288,489 | Proctor | Nov. 13, 1883 |
| 2,123,872 | Whiteley | July 19, 1938 |
| 2,138,659 | Kindig | Nov. 29, 1938 |
| 2,393,203 | Tarbell | Jan. 15, 1946 |
| 2,518,338 | Lampe | Aug. 8, 1950 |
| 2,591,222 | Whiteley | Apr. 1, 1952 |